(12) United States Patent
Savage et al.

(10) Patent No.: US 8,863,288 B1
(45) Date of Patent: Oct. 14, 2014

(54) DETECTING MALICIOUS SOFTWARE

(75) Inventors: David R. Savage, San Antonio, TX (US); Ateeq Sharfuddin, Alexandria, VA (US); Tsu-Yi Lin, Fairfax, VA (US); Benjamin L. Dagana, Eagleville, PA (US)

(73) Assignee: Mantech Advanced Systems International, Inc., Herndon, VA (US)

( * ) Notice: Subject to any disclaimer, the term of this patent is extended or adjusted under 35 U.S.C. 154(b) by 332 days.

(21) Appl. No.: 13/341,002

(22) Filed: Dec. 30, 2011

(51) Int. Cl.
*G06F 11/00* (2006.01)

(52) U.S. Cl.
USPC .............................. 726/24; 726/25; 713/188

(58) Field of Classification Search
USPC ...................... 726/22–26; 713/188
See application file for complete search history.

(56) References Cited

U.S. PATENT DOCUMENTS

| | | |
|---|---|---|
| 7,096,368 B2 | 8/2006 | Kouznetsov et al. |
| 7,861,303 B2 | 12/2010 | Kouznetsov et al. |
| 8,042,186 B1 | 10/2011 | Polyakov et al. |
| 8,341,736 B2 * | 12/2012 | Reasor et al. ................... 726/22 |
| 8,499,353 B2 * | 7/2013 | Lockhart et al. ................ 726/25 |
| 2007/0240218 A1 | 10/2007 | Tuvell et al. |
| 2008/0016339 A1 | 1/2008 | Shukla |
| 2008/0141371 A1 | 6/2008 | Bradicich et al. |
| 2008/0320548 A1 | 12/2008 | Tripathi et al. |
| 2009/0282485 A1 | 11/2009 | Bennett |
| 2010/0077481 A1 | 3/2010 | Polyakov et al. |
| 2010/0154059 A1 | 6/2010 | McNamee et al. |
| 2011/0041179 A1 | 2/2011 | Stahlberg |
| 2011/0099620 A1 | 4/2011 | Stavrou et al. |
| 2011/0197281 A1 | 8/2011 | Alme et al. |
| 2011/0239300 A1 | 9/2011 | Klein et al. |
| 2012/0072968 A1 * | 3/2012 | Wysopal et al. .................. 726/1 |
| 2012/0317645 A1 * | 12/2012 | Fortier ........................... 726/24 |

* cited by examiner

*Primary Examiner* — Amare F Tabor
(74) *Attorney, Agent, or Firm* — The Marbury Law Group, PLLC

(57) ABSTRACT

In systems and methods of detecting malicious software, a software agent comprising at least one scan module is assembled by a source system and is transferred by the source system to a target system. In response to a connection request from the software agent a connection is established to the software agent and a file is received from the target system. At the source system, a static analysis is performed on the transferred file to generate a static threat score, and a dynamic analysis is performed to generate a dynamic threat score. Based on the static threat score and the dynamic threat score an aggregate threat score is generated for the transferred file.

14 Claims, 5 Drawing Sheets

DETECTING MALICIOUS SOFTWARE

TECHNICAL BACKGROUND

Malicious software generally refers to software code which is hostile, intrusive, or annoying. Malicious software typically comprises computer-executable code, including files, scripts, active content, and other software, and may be in discrete form (such as an executable file, for example), or may be a portion of a larger file (for example, embedded in a larger executable file, document, or script). Malicious software can be designed to disrupt or deny the operation of a computer system or network, obtain information from the system or network, enable unauthorized access to system resources, and other behavior. The detection of and response to malicious software is of great importance to owners and operators of computer systems and networks, but can be complicated by a number of factors.

Traditional computer vulnerability assessments and incident response procedures typically provide a snapshot view of malicious software threats. Since malicious software can, for example, remain inactive for a period of time, or until it detects an event or receives a command, using a snapshot view can be ineffective in detecting malicious software. Furthermore, malicious software can be designed to change itself over time, and such polymorphic malicious software can defeat detection techniques which rely on matching search targets against lists of known malicious software and signatures.

OVERVIEW

In operation, a source system assembles a software agent comprising at least one scan module and transfers the software agent to a target system. Once transferred to the target system, the software agent sends a message requesting a connection to the source system, and the source system establishes a connection to the software agent in response to the message. A file of the target system is received from the software agent and the file is analyzed at the source system. A static analysis is performed on the transferred file to generate a static threat score for the transferred file, and a dynamic analysis is performed on the transferred file to generate a dynamic threat score for the transferred file. Based on the static threat score and the dynamic threat score, an aggregate threat score for the transferred file is generated.

DETAILED DESCRIPTION

In an embodiment, a source system assembles a software agent comprising at least one scan module and transfers the software agent to a target system. The software agent sends a connection request to the source system, and the source system establishes a connection to the software agent in response to the connection request. A file of the target system is received from the software agent and is analyzed by the source system. A static analysis is performed on the transferred file to generate a static threat score for the transferred file, and a dynamic analysis is performed on the transferred file to generate a dynamic threat score for the transferred file. Based on the static threat score and the dynamic threat score, an aggregate threat score for the transferred file is generated. When the aggregate threat score meets a threshold, the file is determined to be malicious software.

Figure 1:
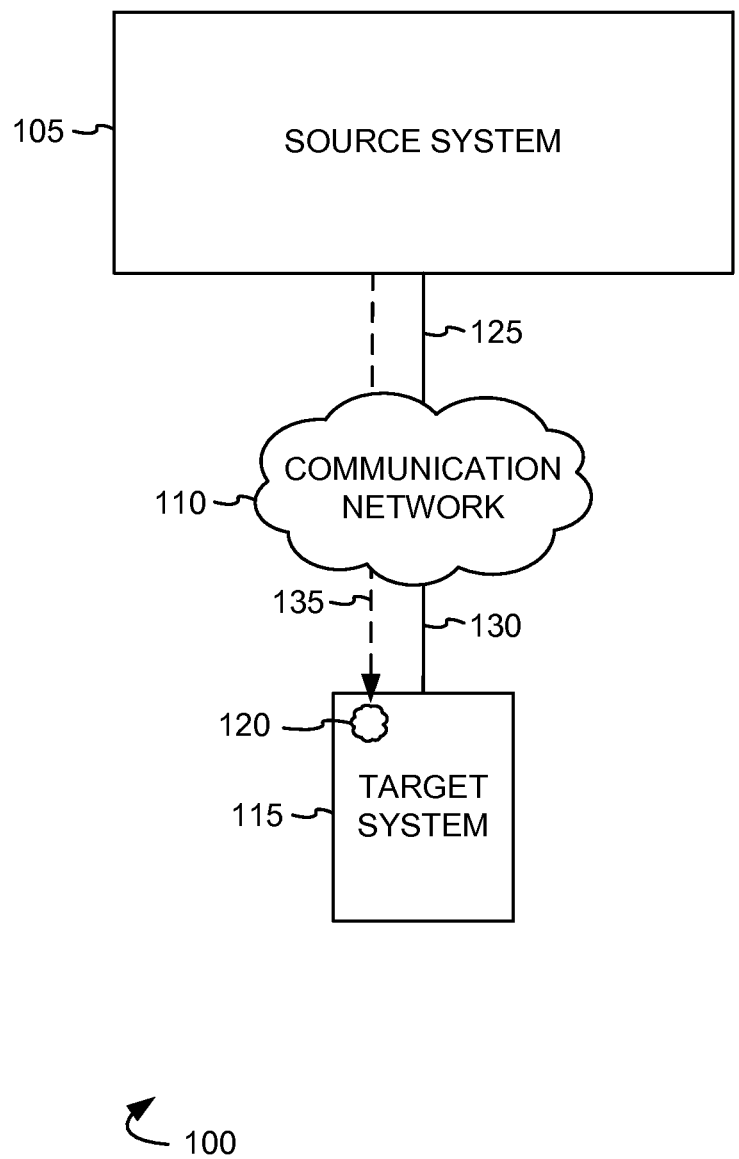
FIG. 1 illustrates an exemplary communication system to detect malicious software.

FIG. 1 illustrates an exemplary communication system 100 to detect malicious software. Communication system 100 comprises source system 105, communication network 110, and target system 115. Source system 105 is in communication with communication network 110 through communication link 125, and communication network 110 is in communication with target system 115 through communication link 130.

Examples of source system 105 can include a standalone computing device, a computer system, or a network component, and can be accessible, for example, by a wired or wireless connection, or through an indirect connection such as through a computer network or communication network. Source system 105 can also receive instructions and other input at a user interface. Source system 105 can comprise a processor and associated circuitry to execute or direct the execution of computer-readable instructions to detect malicious software. Source system 105 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Source system 105 can, among other things, assemble a software agent 120 and transfer 135 the software agent to target system 115.

Communication network 110 facilitates communication between source system 105 and target system 115, and can be a wired and/or wireless communication network. Communication network 110 can comprise processing nodes, routers, gateways, and physical and/or wireless data links for carrying data among various network elements, and combinations, thereof, and can include a local area network, a wide area network, and an internetwork (including the Internet). Wired network protocols that may be utilized by communication network 110 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 110 may also comprise a wireless network, including base stations, wireless communication nodes, telephony switches, internet routers, network gateways, computer systems, communication links, or some other type of communication equipment, and combinations thereof. Wireless network protocols that may be utilized by communication network 110 may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX).

Examples of target system 115 can include a computing platform such as a desktop, laptop, palmtop, or tablet computer, a personal digital assistant, a cell phone, a smart phone, an internet access device, or other device capable of communication with communication network 110. Target system 115 may also store in a storage unit one or more files, information related to the one or more files, and information related to the operation of target system 115. While one target system 115 is illustrated in FIG. 1, this is merely exemplary, and a plurality of target systems may be in communication with communication network 110.

Communication links 125 and 130 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, including the communication protocols described above with regard to communication network 110.

Other network elements may be present to facilitate communication in communication system 100 which are omitted for clarity, including additional processing nodes, routers, gateways, and physical and/or wireless data links, and in the case of wireless communications systems may further include base stations, base station controllers, gateways, mobile switching centers, dispatch application processors, and location registers such as a home location register or visitor location register.

In operation, source system 105 assembles software agent 120 comprising at least one scan module and transfers the software agent to target system 115. Software agent 120 sends a connection request to source system 105, and source system 105 establishes a connection to software agent 120 in response to the connection request. A file of target system 130 is received from software agent 120, and the file is analyzed at source system 105. In an embodiment, a static analysis is performed on the transferred file to generate a static threat score for the transferred file, and a dynamic analysis is performed on the transferred file to generate a dynamic threat score for the transferred file. Based on the static threat score and the dynamic threat score, an aggregate threat score for the transferred file is generated.

Figure 2:
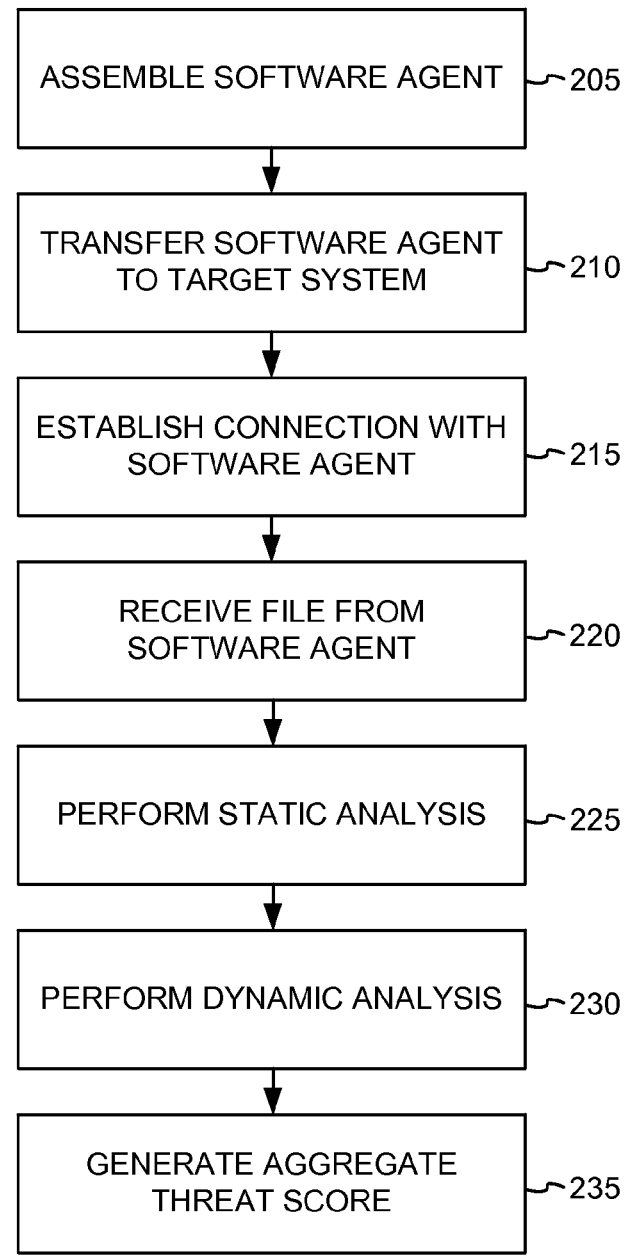
FIG. 2 illustrates an exemplary method of detecting malicious software.

FIG. 2 illustrates an exemplary method 200 of detecting malicious software. In operation 205, a software agent 120 is assembled, for example, at source system 105. The software agent comprises at least one scan module or collection module. For example, a scan module may identify a file on a target system for later analysis. A scan module can also identity a process or processes running on a target system, and can also identify files with a predetermined structure, for example, a portable executable (PE) structure. Other scan modules to identify files, processes or other information from the target system are also possible.

Software agent 120 is transferred to target system 115 (operation 210). The transfer 135 can be performed, for example, by a direct connection between source system 105 and target system 115, including through a direct wired or wireless communication, through use of a non-transitory storage medium to deliver software agent 120 to target system 115, or through a network such as communication network 110. Software agent 120, once transferred to the target system 115, sends a message to source system 105. The message may be a request that source system 105 establish communication with software agent 120. The message may also include information from target system 115 which is transferred with the message to source system 105. A connection is then established by source system 105 with software agent 120 in response to the message to establish communication between source system 105 and software agent 120 (operation 215).

Source system 105 may receive a file from software agent 120 which has been obtained by software agent 120 from target system 115 (operation 220). The file can be executable software code, or it can be a document, a script, active content, or other document, and may be in discrete form or may be a portion of a larger file. In operation, the received file is typically a copy of a file on target system 115. Source system 105 may also receive information from target system 115 related to the file. Source system 105 may also receive system information from target system 115, such as, for example, processes, user names, memory cache data (such as DNS cache data and ARP cache data), registry data, and other forms of metadata. In an embodiment, the file can be a file which is identified based on its internal structure. For example, a file can be determined to have a PE structure, and based on the identified PE structure can be sent to source system 105.

Source system 105 performs a static analysis of the received file (operation 225). The static analysis can be an analysis of the internal structure of the received file. As an example, the file can be analyzed for anomalies in the internal structure, which may be expected as a result of modification of the file, or as a result of non-standard programming, assembly or compilation. In an embodiment, a plurality of analyses are performed on the received file, and the results of the plurality of analyses are used to generate a static threat score for the transferred file.

Source system 105 also performs a dynamic analysis of the received file (operation 230). The dynamic analysis can be an analysis of the function of executable code of the received file. For example, when the file contains executable code, the file can be executed and its activities observed. In operation, the file can be executed in an isolated environment, such as a sandbox or other isolated computing environment, to prevent potentially malicious software from affecting source system 105. In an embodiment, based on the determined activities of the file, a plurality of dynamic analyses may be performed on the file, and the results of the plurality of analyses are used to generate a dynamic threat score for the transferred file.

Based on the static threat score and the dynamic threat score, an aggregate threat score for the file is generated (operation 235). Using the aggregate threat score, the file can be determined to be malicious software. A notification can be provided indicating the determination, and source system 105 can further receive instructions to respond to the determination that the file is malicious software.

Figure 3:
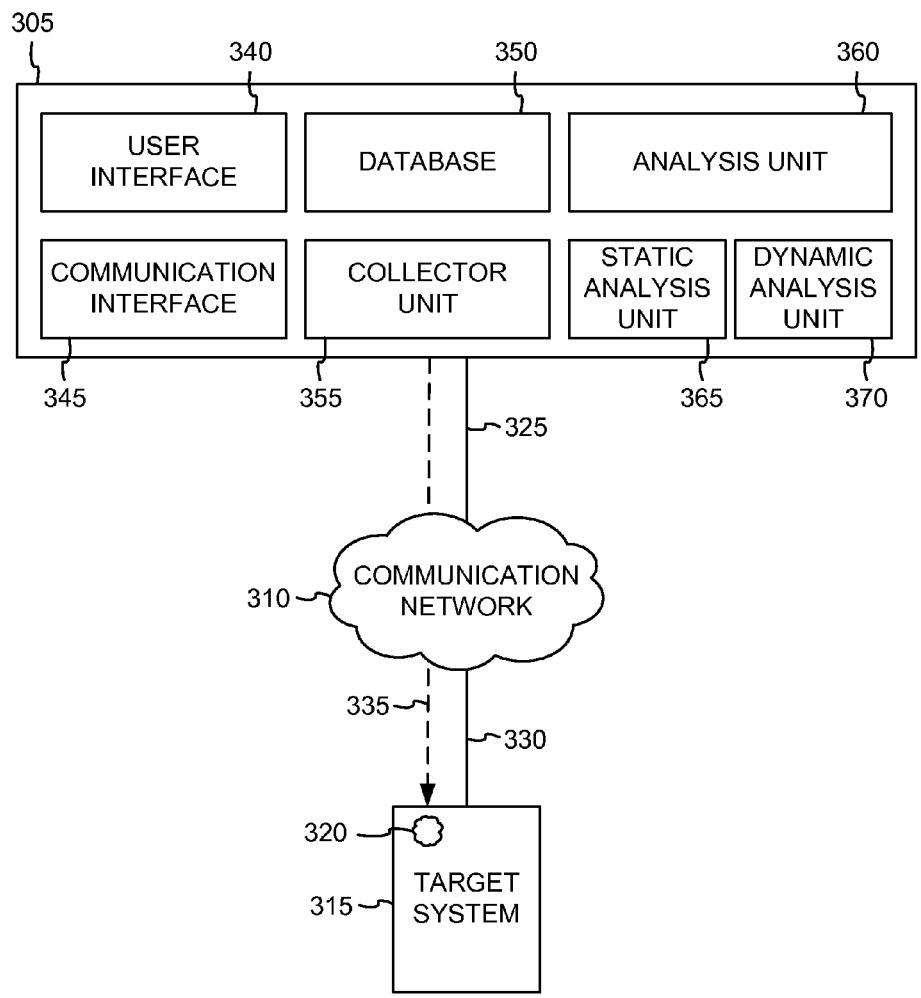
FIG. 3 illustrates another exemplary communication system to detect malicious software.

FIG. 3 illustrates another exemplary communication system 300 to detect malicious software. Communication system 300 comprises source system 305, communication network 310, and target system 315. Source system 305 is in communication with communication network 310 through communication link 325, and communication network 310 is in communication with target system 315 through communication link 330.

Communication network 310 facilitates communication between source system 305 and target system 310, and can be a wired and/or wireless communication network. Communication network 310 is analogous to communication network 110, and further description thereof is omitted for brevity.

Examples of target system 315 can include a computing platform such as a desktop, laptop, palmtop, or tablet computer, a personal digital assistant, a cell phone, a smart phone, an internet access device, or other device capable of communication with communication network 310. Target system 315 may also store in a storage unit one or more files, information related to the one or more files, and information related to the operation of target system 315. While one target system 315 is illustrated in FIG. 3, this is merely exemplary, and a plurality of target systems may be in communication with communication network 310.

Communication links 325 and 330 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example the communication protocols described above with regard to communication network 110. Other network elements may be present to facilitate communication in communication system 300 which are omitted for clarity, including additional processing nodes, routers, gateways, and physical and/or wireless data links, and in the case of wireless communications systems may further include base stations, base station controllers, gateways, mobile switching centers, dispatch application processors, and location registers such as a home location register or visitor location register.

Examples of source system 305 can include a standalone computing device, a computer system, or a network component, and can be accessible, for example, by a wired or wireless connection, directly or through an indirect connection such as through a computer network or communication network. Source system 305 comprises user interface 340, communication interface 345, database 350, collector unit 355, analysis unit 360, static analysis unit 365, and dynamic analysis unit 370.

User interface 340 permits the receipt of instructions at source system 305. User interface 340 can comprise a panel, terminal, keyboard, touch screen, or other device configured to accept input. User interface 340 can also comprise an interface which permits receipt of instructions through communication interface 345, for example, from a remote computing device, panel, terminal, keyboard, touch screen, or other similar device, and such instructions can be transmitted through a computer network or internetwork (including the Internet) or a wired or wireless communication link. Communication interface 345 permits source system 305 to communicate with communication network 310, as well as to provide information to and receive instructions through user interface 340.

Database 350 is a device including computer-readable recording medium, comprising, for example, random-access memory (RAM), erasable electrically programmable ROM (EEPROM), flash memory or other memory technology, holographic media or other optical disc storage, magnetic storage including magnetic tape and magnetic disk, and solid state storage devices. Database 350 can store a received file and received information, the results of a static and a dynamic analysis of the received file and information, and threat scores related to the file and information including a static threat score, a dynamic threat score, and an aggregate threat score. Database 350 can also store additional data to enable an analysis of the received file and received information.

Collector unit 355 can receive a file and other information from a target system, for example, target system 315, provided by software agent 320. Collector unit 355 can also store commands to be communicated to software agent 320 when communication is established between source system 305 and software agent 320. Collector unit 355 provides received files and information to analysis unit 360 for analysis.

Analysis unit 360 coordinates the analysis of a received file, information related to the received file, and other information received from target system 315. Analysis unit 360 provides the received file and received information to static analysis unit 365 and to dynamic analysis unit 370 and coordinates the analyses performed by static analysis unit 365 and dynamic analysis unit 370. In an embodiment, static analysis unit 365 generates a static threat score, and dynamic analysis unit 370 generates a dynamic threat score, both of which are provided to analysis unit 360. In another embodiment, static analysis unit 365 and dynamic analysis unit 370 perform analyses of the received file and received information and provide the results of the analyses to analysis unit 360, which generates the static threat score and dynamic threat score. Analysis unit 360 also generates an aggregate threat score for the received file based on the static threat score and the dynamic threat score.

Dynamic analysis unit 370 can execute executable portions of a received file, and may do so in an isolated computing environment to prevent potentially malicious software from affecting source system 305. Dynamic analysis unit may, for example, comprise processing circuitry and a memory device separate from other elements of source system 305, and may also be a physically separate computing device in communication with source system 305 by a communication link, to further isolate potentially malicious software from other components or operations of source system 305.

Figure 4:
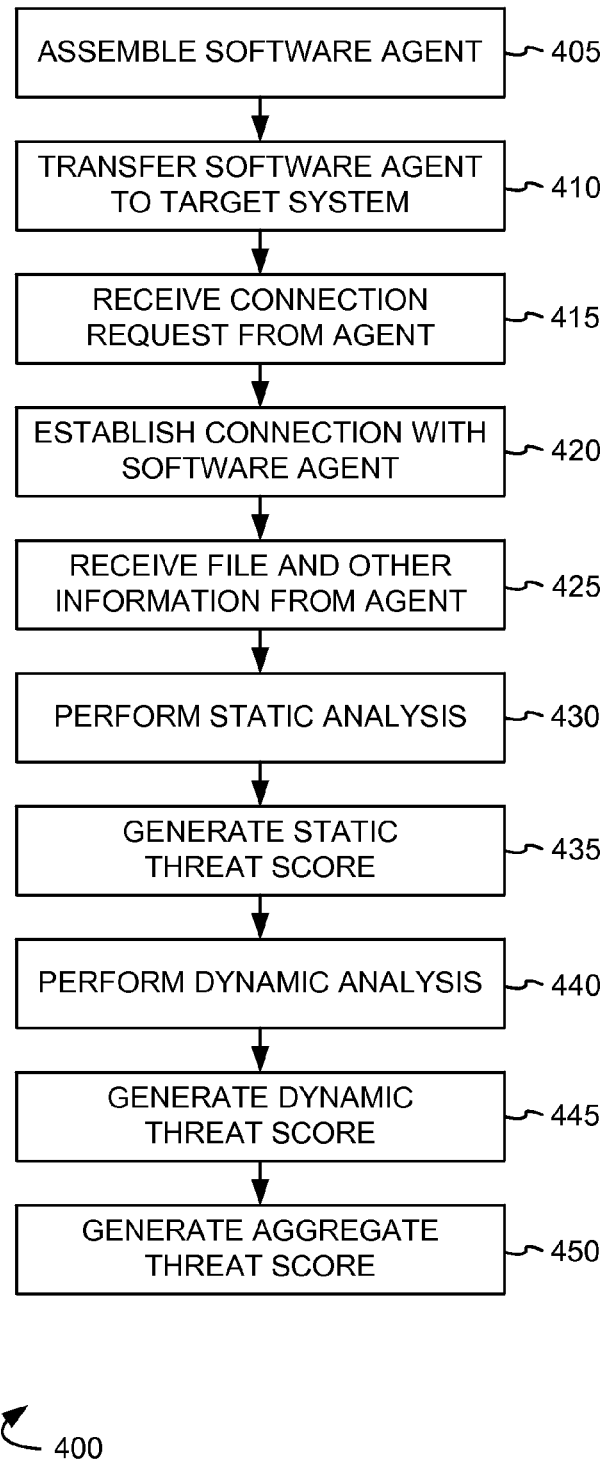
FIG. 4 illustrates another exemplary method of detecting malicious software.

FIG. 4 illustrates another exemplary method 400 of detecting malicious software. Source system 305 assembles a software agent 320 (operation 405). Software agent 320 comprises at least one scan module to perform a designated scan on target system 315. Examples of scans designated by scan modules include a hash scan of files of target system 315, a scan for files with a designated internal structure (such as a PE format), and a determination of a file path, files size, or times of file activity (for example, file modification, access, or metadata change). Other possible scans include collecting network activity history (including web browser history and cache data), ARP cache data, target system process data (such as process identifiers, loaded modules, handles and threads), network connection data (including network socket data, interfaces, open ports, associated services, and foreign addresses), user account information, local and remotely mounted storage devices, installed applications, autorun applications, hardware profile and removable media information, and clock skew.

Software agent 320 can also be instructed to send a message to collector unit 355 through communication interface 345 after software agent 320 is transferred to target system 315 to request establishment of communication between source system 305 and target system 315. Software agent 320 can further be instructed to permit source system 305 direct access (including real-time access) to target system 315. Such access can be outside established restrictions on user access control, for example, as may be typically placed on a computing device or system such as target system 315. In an embodiment, software agent 320 can be instructed to capture network traffic of target system 315, for example, at specified network ingress and egress points (such as designated ports). In an embodiment, software agent 320 can be instructed to determine a list of IP to MAC address mappings used during network traffic collection.

Software agent 320 is transferred to target system 315 (operation 410). The transfer 335 can be performed, for example, by a direct connection between source system 305 and target system 315, including through a direct wired or wireless communication, through use of a non-transitory storage medium to deliver software agent 320 to target system 315, or through a network such as communication network 310. Software agent 320 can be instructed to operate on target system 315 to utilize a relatively small amount of system resources of target system 315. Software agent 320 can also be designed to be difficult to detect by a user of target system 315. For example, software agent 320 can execute only in volatile memory of target system 315 (such as random access memory), so that installation of the software agent 320 in other portions of a memory (such as a hard disk) of target system 315 is not required for operation of software agent 320. Software agent 320 can also be instructed to use only unallocated processor cycles of a processor of target system 315, to reduce interference by software agent 320 with other operations of target system 315. Software agent 320 can further be instructed to obscure or hide its processes from process lists or task lists on target system 315, which for example would otherwise indicate processes being executed on target system 315. Software agent 320 can also be instructed to erase itself after a predetermined period of time.

When software agent 320 is transferred to target system 315, software agent 320 executes one or more scan modules, and based on the operation of the one or more scan modules software agent 320 identifies a file for transfer to source system 305. A scan module can scan the memory of target system 315, including any memory in communication with or accessible by target system 315, including locally attached drives, network drives, optical media including CDs and DVDs, flash memory such as USB drives, and other such memory. As an example, software agent 320 can execute a scan module which identifies a file with a designated file format or structure (such as a PE format) for transfer to source system 305. For another example, a scan module can identify all files on target system 315 having a PE format. As a further example, a scan module can identify all files which are "hidden" in the memory of target system 315 (which files could, for example, be assumed to be suspicious).

Software agent 320 can also execute a scan module which identifies that a file or information about the file matches a known file or information about a file within a deviation threshold. For example, the scan module can perform a scan of a file on target system 315 to analyze the properties or the content of the file, and can identify whether the file or the information is similar to a known file or information within a predetermined range of similarity. Accordingly, a file or information can be identified for transfer to source system 305 even when the file is not identical to a known file or information. In an embodiment, the scan of the file can be a hash scan, such as by using a cryptographic hash, and the deviation threshold can be, for example, a predetermined percentage value.

In an embodiment, a scan module can also determine if a copied file or document is present on target system 315. A copy of a document or of software often uses a different file name than the original document or file in an attempt to obscure the fact that it is a copy. In addition, minor alterations to the document or software itself may be made, also to obscure the fact that it is a copy. A scan module can perform a scan of a file on target system 315 to analyze the properties or the content of the file and can identify whether the file meets a deviation threshold in order to determine whether the file is a copy of a known file. Thus, when a file is analyzed, while an exact match may not be found, if the file or information meets a deviation threshold it can still be determined that the analyzed file or other data information is a copy. In this way, communication system 300 can identify not only potentially malicious software, but also can detect copied files and information on target system 315.

Software agent 320 sends a message to collector unit 355 through communication interface 345 (operation 415). The message may be a request that source system 305 establish communication with software agent 320. The message may also include a file and/or information from target system 315 which is transferred with the message to source system 305.

A connection is then established by source system 305 with software agent 320 in response to the message (operation 420). The established connection can be encrypted to provide additional security for communications between source system 305 and software agent 320. In an embodiment, the established connection is an encrypted remote procedure (RPC) tunnel. When source system 305 establishes a connection with software agent 320, additional instructions can be provided to software agent 320. For example, collector unit 355 can queue instructions for software agent 320 which are provided to software agent 320 when a connection is established by source system 305. The queued instructions can include an instruction to cancel one or more scan modules of software agent 320. Instructions can also include an instruction to stop activity and go dormant, and an instruction to self-erase. If software agent 320 includes a scan module which permits the establishment of direct communication between source system 305 and target system 315 (that is, communication not mediated by software agent 320) then when source system 305 establishes a connection with software agent 320, such direct communication can proceed between source system 305 and target system 315.

When the connection is established between source system 305 and software agent 320, a file and other information of target system 315 can be received at collector unit 355 of source system 305 from software agent 320 (operation 425). In operation, the received file is typically a copy of a file on target system. In an embodiment, the file or information has been identified by a scan module of software agent 320, and can be executable software code, or it can be a document, a script, active content, or other document, and may be in discrete form or may be a portion of a larger file. Source system 305 can also receive information from target system 315 related to the file, and information from target system 315.

Collector unit 355 stores received files and information in database 350, and also provides the received file and/or information to analysis unit 360, which coordinates analyses of received files and information. Analysis unit 360 provides the received file and information to static analysis unit 365 and to dynamic analysis unit 370.

Static analysis unit 365 performs static analysis of received files and information (operation 430). The static analysis can be an analysis of the internal structure of the received file. For example, the file can be analyzed for anomalies in the internal structure, for example, which may be expected as a result of modification of the file, or as a result of non-standard programming, assembly or compilation. In an embodiment, a plurality of analyses are performed on the received file, and the results of the plurality of analyses are used to generate a static threat score for the transferred file. The plurality of static analyses can comprise analyses of structure of the file, including a hash analysis (such as MD5, SHA1, SHA256, and including whether a file or information meets a deviation threshold), a file structure string analysis (such as ASCII, Unicode, and Section Names), a file structure compiler analysis (including import/export table), a file structure packer analysis, file certificate analysis (including verifying chain of trust, self-signed, forged, or legitimate status), a callout domain and IP address identification, a domain name analysis (including netblock registration and forward or reverse resolutions), a whitelist analysis (using, for example, PE format hash, or analyzing an IP address/domain name/URL in the file, of an analysis of a code segment, or whether a file or information meets a deviation threshold), and a memory analysis (such as analyzing hooks, whether the file includes any unlinked processes or drivers, keystroke logging techniques, file hiding techniques, executable content). In an embodiment, the result of each of the plurality of analyses is scored, and based on the results a static threat score is generated for the file (operation 435). The results of each of the plurality of analyses and the static threat score are stored in database 350.

Dynamic analysis unit 370 performs a dynamic analysis of received files and information (operation 440). The dynamic analysis can be an analysis of the function of executable code of the received file. For example, when the file contains executable code, the file can be executed and its activities observed. In operation, the file can be executed in an isolated environment, such as a sandbox or other isolated computing environment, to prevent potentially malicious software from affecting source system 105. In an embodiment, based on the determined activities of the file, a plurality of dynamic analyses may be performed on the file, and the results of the plurality of analyses are used to generate a dynamic threat score for the transferred file (operation 445). The plurality of dynamic analyses can comprise an emulated user interaction, an anti-virus range analysis, an evasion identification, a file and packet analysis, a running executable analysis, a service analysis, a process analysis, a registry analysis, a network activity analysis, and a memory analysis. The results of each of the plurality of analyses and the dynamic threat score are stored in database 350.

Based on the static threat score and the dynamic threat score, an aggregate threat score for the file is generated (operation 450). Using the aggregate threat score, the file can be determined to be malicious software. For example, if the aggregate threat score meets a threat score threshold, the file or information can be determined to be malicious software. The aggregate threat score and the determination are stored in database 350. A notification can be provided indicating the determination, for example through user interface 340. Source system 305 can further receive commands to respond to the determination that the file is malicious software. For example, target system 315 can be taken offline for remediation of the detected malicious software. In addition, target system 315 can be monitored for the activity of the malicious software, for example, to determine if the malicious software attempts to send a message, and to determine the target destination and the nature of the message.

Figure 5:
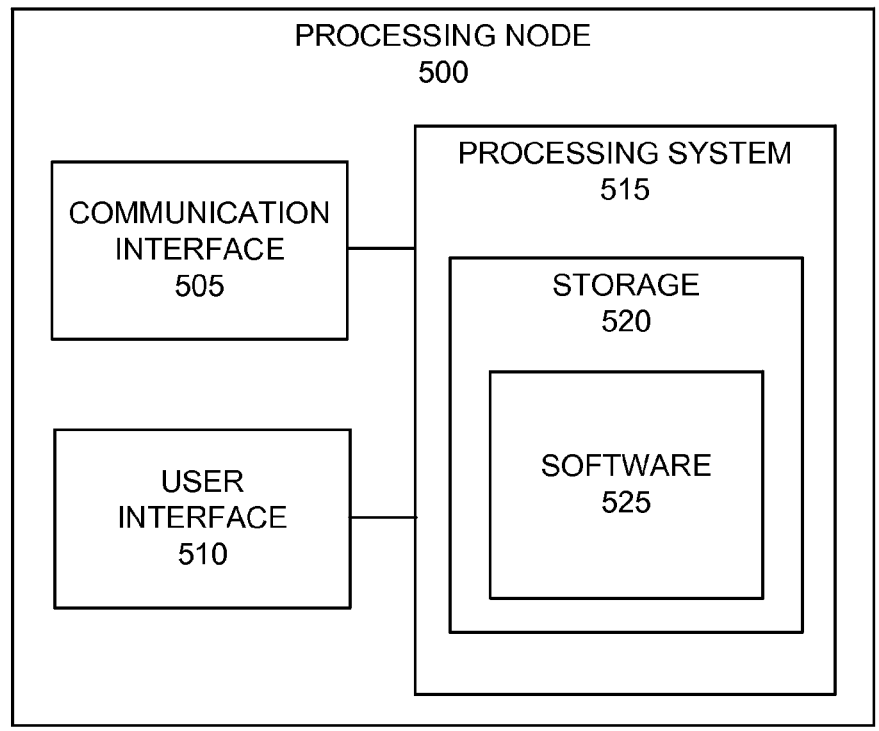
FIG. 5 illustrates an exemplary processing node.

FIG. 5 illustrates an exemplary processing node 500 in a communication system. Processing node 500 comprises communication interface 505, user interface 510, and processing system 515 in communication with communication interface 505 and user interface 510. Processing node 500 is capable of detecting malicious software. An example of communication interface 505 is communication interface 345, and an example of user interface 510 is user interface 340. Processing system 515 includes storage 520, which can comprise a disk drive, flash drive, memory circuitry, or other memory device. Storage 520 can store software 525 which is used in the operation of the processing node 500. Storage 520 may include a disk drive, flash drive, data storage circuitry, or some other memory apparatus. Software 535 may include computer programs, firmware, or some other form of machine-readable instructions, including an operating system, utilities, drivers, network interfaces, applications, or some other type of software. Processing system 515 may include a microprocessor and other circuitry to retrieve and execute software 525 from storage 520. Processing node 500 may further include other components such as a power management unit, a control interface unit, etc., which are omitted for clarity. Communication interface 505 permits processing node 500 to communicate with other network elements. User interface 510 permits the configuration and control of the operation of processing node 500.

Examples of processing node 500 include source system 105 and source system 305. Processing node 500 can also be an adjunct or component of a network node or other network element in a communication system. As an example, processing system 515 can include collector unit 355, analysis unit 360, static analysis unit 365 and dynamic analysis unit 370. An example of storage 520 is database 350.

The exemplary systems and methods described herein can be performed under the control of a processing system executing computer-readable codes embedded on a computer-readable recording medium or on communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, signals which modulate carrier waves transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of detecting malicious software, comprising:
assembling by a source system a software agent comprising at least one scan module;
transferring the software agent to a target system;
establishing a connection to the software agent in response to a connection request from the software agent;
receiving a file of the target system from the software agent;
performing at the source system a static analysis on an internal file structure of the transferred file to generate a static threat score for the transferred file, wherein the static analysis further comprises at least one of a hash calculation, a string extraction, a file structure format parsing, a file structure compiler analysis, a file structure packer analysis, a binary similarity analysis, a file certificate analysis, a callout domain name and IP address analysis, a domain name analysis, a white list analysis, and a memory analysis, and wherein the static threat score further comprises a score assigned based on the static analysis;
performing at the source system a dynamic analysis on the transferred file to generate a dynamic threat score for the transferred file, wherein the dynamic analysis further comprises at least one of an emulated user interaction, an anti-virus range analysis, an evasion identification, a file and packet analysis, a running executable analysis, a service analysis, a process analysis, a registry analysis, a network activity analysis, and a memory analysis, and wherein the dynamic threat score further comprises a score assigned based on the dynamic analysis; and generating an aggregate threat score for the transferred file based on the static threat score and the dynamic threat score.

2. The method of claim 1, wherein establishing a connection further comprises establishing a connection by the source system to the software agent in response to a connection request by the software agent to provide additional commands which are queued at the source system to the software agent.

3. The method of claim 1, wherein in receiving a file, the file further comprises information related to the file from the target system.

4. The method of claim 1, wherein in receiving a file, the file further comprises a file identified by the software agent as meeting a deviation threshold.

5. The method of claim 1, wherein the static analysis further comprises an analysis to identify that the file or information about the file meets a deviation threshold.

6. The method of claim 1, wherein the software agent comprises one or more scan modules.

7. The method of claim 1, wherein transferring the software agent further comprises executing the software agent in volatile memory of the target system without further installation in the target system.

8. The method of claim 1, wherein establishing a connection further comprises determining that additional instructions from the source system are queued for the software agent.

9. The method of claim 8, wherein the software agent comprises one or more scan modules, and at least one scan module is executed according to the additional instructions from the source system.

10. The method of claim 8, wherein the software agent comprises one or more scan modules, and at least one scan module is canceled according to the additional instructions from the source system.

11. A system for detecting malicious software, comprising:
a processing node, configured to
assemble a software agent comprising at least one scan module;
transfer the software agent to a target system;
establish a connection to the software agent in response to a connection request from the software agent;
receive a file of the target system from the software agent;
perform a static analysis on an internal file structure of the transferred file to generate a static threat score for the transferred file, wherein the static analysis further comprises at least one of a hash calculation, a string extraction, a file structure format parsing, a file structure compiler analysis, a file structure packer analysis, a binary similarity analysis, a file certificate analysis, a callout domain name and IP address analysis, a domain name analysis, a white list analysis, and a memory analysis, and wherein the static threat score further comprises a score assigned based on the static analysis;
perform a dynamic analysis on the transferred file to generate a dynamic threat score for the transferred file, wherein the dynamic analysis further comprises at least one of an emulated user interaction, an anti-virus range analysis, an evasion identification, a file and packet analysis, a running executable analysis, a service analysis, a process analysis, a registry analysis, a network activity analysis, and a memory analysis, and wherein the dynamic threat score further comprises a score assigned based on the dynamic analysis; and
generate an aggregate threat score for the transferred file based on the static threat score and the dynamic threat score.

12. The system of claim 11, wherein the processing node is further configured to establish a connection to the software agent in response to a connection request by the software agent to provide additional commands which are queued at the processing node to the software agent.

13. The system of claim 11, wherein the processing node is further configured to receiving a file identified by the software agent as meeting a deviation threshold.

14. The system of claim 11, wherein the software agent executes in volatile memory of the target system without further installation in the target system.

* * * * *